(12) United States Patent
Ruff et al.

(10) Patent No.: US 10,086,727 B1
(45) Date of Patent: Oct. 2, 2018

(54) VEHICLE SEAT

(71) Applicants: TS TECH CO., LTD., Asaka-shi, Saitama (JP); HONDA MOTOR CO., LTD., Tokyo (JP)

(72) Inventors: Jeremy Ruff, Reynoldsburg, OH (US); Teppei Ito, Reynoldsburg, OH (US); Souheil Hage-Hassan, Reynoldsburg, OH (US); Travis M. Reel, Marysville, OH (US); Fernando M. Rosero, Marysville, OH (US)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/464,806

(22) Filed: Mar. 21, 2017

(51) Int. Cl.
  *B60N 2/00* (2006.01)
  *B60N 2/64* (2006.01)
  *B60N 2/58* (2006.01)
  *B60N 2/28* (2006.01)

(52) U.S. Cl.
  CPC .............. *B60N 2/64* (2013.01); *B60N 2/5816* (2013.01); *B60N 2/2887* (2013.01)

(58) Field of Classification Search
  CPC ....... B60N 2/64; B60N 2/5816; B60N 2/2887
  USPC .................................................... 297/452.27
  See application file for complete search history.

(56) References Cited

U.S. PATENT DOCUMENTS

| 3,915,493 | A * | 10/1975 | Brown | B60N 2/0155 248/501 |
| 6,226,819 | B1 * | 5/2001 | Ogawa | A47C 7/18 297/452.27 |
| 6,571,411 | B1 * | 6/2003 | Ebe | B60N 2/3011 297/452.27 |
| 7,946,649 | B2 * | 5/2011 | Galbreath | B60N 2/5825 297/218.1 |
| 8,282,164 | B2 | 10/2012 | Galbreath et al. | |
| 8,308,235 | B2 * | 11/2012 | Ellison | B60N 2/7005 297/452.27 X |
| 8,398,166 | B2 * | 3/2013 | Lindsay | B29C 44/0461 297/452.27 X |
| 8,408,655 | B2 * | 4/2013 | Ellison | B60N 2/015 297/216.1 |
| 8,439,440 | B2 * | 5/2013 | Ellison | B29C 44/0461 297/452.27 X |
| 8,540,318 | B2 * | 9/2013 | Folkert | B60N 2/686 297/452.14 |
| 8,696,067 | B2 * | 4/2014 | Galbreath | B60N 2/012 297/452.27 X |
| 2004/0245837 | A1 * | 12/2004 | Clifford | A47C 7/022 297/452.26 |
| 2005/0140199 | A1 * | 6/2005 | Kang | B60N 2/4263 297/452.27 |
| 2009/0146472 | A1 * | 6/2009 | Galbreath | B60N 2/2887 297/216.1 |

* cited by examiner

Primary Examiner — Rodney B White
(74) Attorney, Agent, or Firm — Drinker Biddle & Reath LLP

(57) ABSTRACT

A vehicle seat includes a seat pad and a bracket configured to be held by the seat pad. The seat pad includes a first pad member and a second pad member firmer than the first pad member. The bracket includes an embedded portion embedded in the second pad member and a protrusion that protrudes outward from the second pad member. The protrusion includes an attachment surface in which a through-hole for attachment of a component is formed.

11 Claims, 13 Drawing Sheets

VEHICLE SEAT

BACKGROUND

The present disclosure relates to a vehicle seat.

A conventionally known vehicle seat to be installed in a vehicle such as an automobile is configured such that a seat pad made of foamed resin is covered by a cover in order to improve seating comfort. Also, if electric components such as a motor, an electronic control unit (ECU), and a wiring harness are attached to a vehicle seat, a space for attachment of the electric components is needed. In this regard, a vehicle seat in which electric components can be placed in a hollow portion formed in a seat pad is described in U.S. Pat. No. 8,282,164.

However, in the above-described related art, the electric components are placed in the seat pad; therefore, it is difficult to attach and remove the electrical components and the performance of maintenance on the components is thus low.

SUMMARY

The present disclosure has been made in view of the above-described problem. Various embodiments of the present disclosure provide a vehicle seat in which the workability of attaching or removing components such as electric components is improved.

The foregoing problem is solved by an embodiment of a vehicle seat according to the present disclosure, the vehicle seat including a seat pad and a bracket configured to be held by the seat pad. The seat pad includes a first pad member and a second pad member that is firmer than the first pad member. The bracket includes an embedded portion embedded in the second pad member and a protrusion that protrudes outward from the second pad member, and the protrusion includes an attachment surface in which a hole for attachment of a component is formed. According to the vehicle seat, components such as electric components can be attached to the outer side of the seat pad. Therefore, the workability of attaching or removing components to or from the vehicle seat can be improved. Consequently, maintenance on the components such as the electric components to be attached to the vehicle seat is facilitated. Also, a portion of the bracket is embedded in the pad member with high rigidity to be held by the pad member; thereby, the rigidity of attachment of the bracket can be enhanced.

According to an embodiment of the present disclosure, in the vehicle seat, the second pad member may be made of expanded polypropylene and may be injection-molded with the bracket. With this construction, the rigidity of the seat pad can be enhanced. Also, the bracket can be firmly held by the seat pad.

According to another embodiment of the present disclosure, in the vehicle seat, the first pad member may be made of urethane foam and may be arranged on the second pad member. Thus, a member of the seat pad, which is located close to an occupant is made of urethane foam; thereby, seating comfort of the vehicle seat can be improved.

According to still another embodiment of the present disclosure, in the vehicle seat, a through-hole may be formed in the embedded portion. With this configuration, the bracket can be firmly attached to the second pad member. Therefore, the bracket can be prevented from disengaging from the second pad member.

According to a further embodiment of the present disclosure, in the vehicle seat, the second pad member may include a rear surface portion which is not covered by the first pad member, and the protrusion may protrude from the rear surface portion to a rear of the seat. With this configuration, the bracket on which components are to be attached can be arranged on a rear surface of the seat pad. Therefore, the components can be arranged in such a manner as not to interfere with an occupant.

According to a still further embodiment of the present disclosure, in the vehicle seat, a cutout may be formed in a rear end portion of the second pad member. The bracket may be attached to overlap the cutout, and a clearance may be provided between a front end of the cutout and a front end of the bracket. With this configuration, a wiring harness can be inserted in the clearance between the cutout and the bracket. Therefore, flexibility in arranging components in the vehicle seat and wiring can be increased.

According to an embodiment of the present disclosure, the vehicle seat may further include a cover configured to cover the seat pad. A pull-in hole, through which an end portion of the cover extends, may be formed in the first pad member. An opening may be formed in the second pad member to face a bulging portion of the first pad member formed by downwardly bulging a bottom surface portion of the first pad member, and the end portion of the cover may be locked through the pull-in hole and the opening to a cover lock portion formed in a back surface of the second pad member. Accordingly, the end portion of the cover, which is located on a seating surface portion, is coiled to be fixed to the cover lock portion; thereby, the workability of pulling in the cover can be improved. Also, a hard member such as a wire, which is a member to be pulled, is not provided below the seating surface portion; therefore, seating comfort can be improved.

According to another embodiment of the present disclosure, in the vehicle seat, a guide groove in which a wiring harness is arranged may be formed in a back surface of the second pad member. With this configuration, the wiring harness is arranged along the guide groove; thereby, the workability of arranging the wiring harness can be improved. Also, the wiring harness is protected by the guide groove; therefore, the wiring harness can be inhibited from being disconnected.

According to still another embodiment of the present disclosure, the vehicle seat may further include a cover configured to cover the seat pad and a hook-and-loop fastener attached to the cover to hold a wiring harness. With this configuration, the wiring harness is easily held along the cover. Therefore, the wiring harness can be easily arranged and the performance of maintenance on the wiring harness can be enhanced.

According to a further embodiment of the present disclosure, in the vehicle seat, a plurality of insertion slots, through each of which an ISOFIX connector is inserted, may be formed in the second pad member. A first portion of the second pad member, covered by the first pad member, may be provided between the plurality of insertion slots, and a second portion of the second pad member, not covered by the first pad member, may be provided in peripheries around the plurality of insertion slots. With this configuration, the second pad member is provided not to make contact with the lumbar region of an occupant; thereby, seating comfort can be improved. Also, the insertion slot through which the ISOFIX connector of a child safety seat is inserted is not covered by the first pad member; thereby; the ISOFIX connector can be easily inserted. Consequently, the child safety seat can be easily installed.

According to the present disclosure, the workability of attaching or removing components such as electric components to or from the vehicle seat can be improved. According to an embodiment of the present disclosure, the rigidity of the seat pad can be enhanced. According to another embodiment of the present disclosure, seating comfort of the vehicle seat can be improved. According to still another embodiment of the present disclosure, the bracket can be inhibited from disengaging from the second pad member. According to a further embodiment of the present disclosure, components such as electric components can be arranged not to interfere with an occupant. According to a still further embodiment of the present disclosure, flexibility in arranging components such as electric components can be increased. According to an embodiment of the present disclosure, the workability of pulling in the cover can be improved. According to another embodiment of the present disclosure, a hard member such as a wire, which is a member to be pulled, is not provided below the seating surface portion; therefore, seating comfort can be improved. According to still another embodiment of the present disclosure, the wiring harness can be inhibited from being disconnected. According to a further embodiment of the present disclosure, the wiring harness can be easily arranged and thus the performance of maintenance on the wiring harness can be enhanced. According to a still further embodiment of the present disclosure, a child safety seat can be easily installed.

BRIEF DESCRIPTION OF DRAWINGS

Various embodiments of the invention are illustrated in the drawings, in which.

DETAILED DESCRIPTION

A vehicle seat 1 (an example of a vehicle seat) according to an embodiment of the present disclosure (hereinafter referred to as an embodiment) will hereinafter be described with reference to FIGS. 1 to 13. Embodiments below are merely examples for facilitating understanding of the present disclosure, and the embodiments do not restrict the present disclosure. In other words, it is understood that shapes, dimensions, and arrangements, or the like of members described below may be changed and modified without departing from the scope of the invention and that the invention may include equivalents thereof. Also, a front to back direction, a right to left direction, and an up to down direction will hereinafter coincide with those directions seen from an occupant when seated on the vehicle seat 1.

Figure 1:
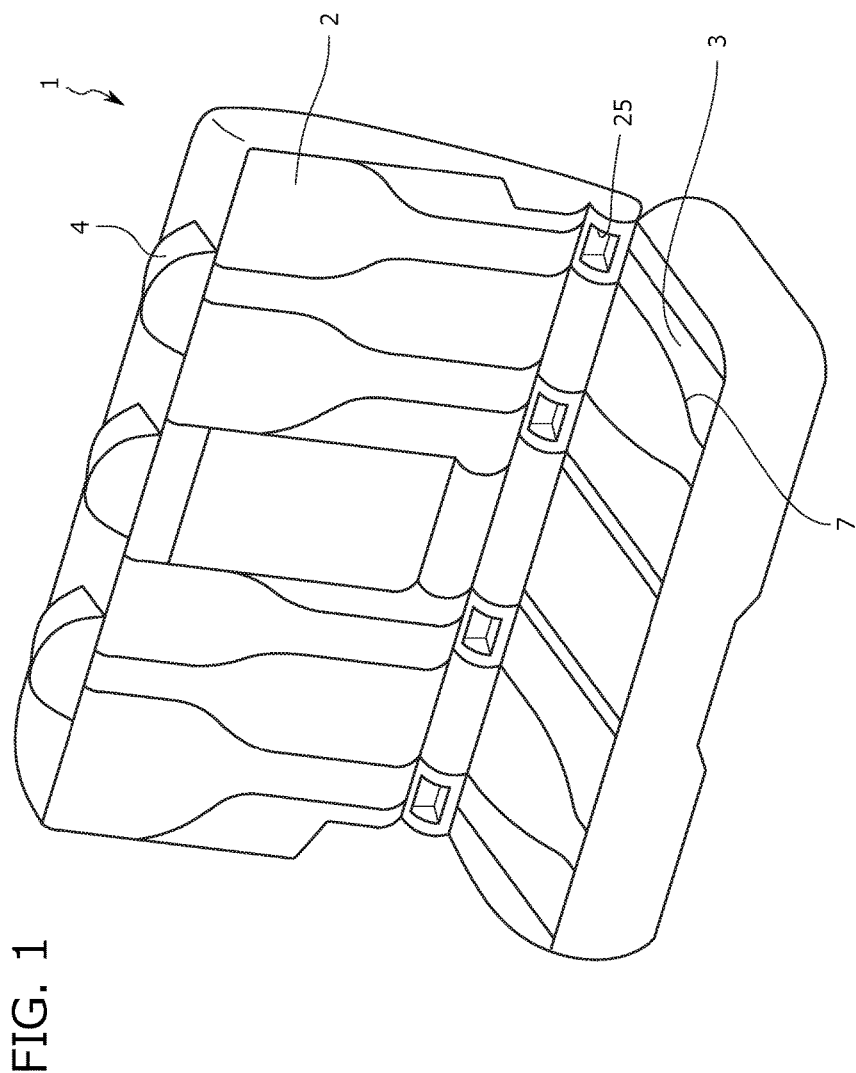
FIG. 1 is a perspective view showing a vehicle seat according to an embodiment.

FIG. 1 is a perspective view showing the vehicle seat 1, according to an embodiment. As shown in FIG. 1, the vehicle seat 1 is a rear seat for an automobile on which three occupants can be seated. The vehicle seat 1 includes a seat back 2, a seat cushion 3, and a headrest 4.

The seat back 2 is a portion of the vehicle seat 1 which is configured to support the back and lumbar region of a seated occupant. The seat cushion 3 is a portion of the vehicle seat 1 which is configured to support the buttocks or thighs of the seated occupant. The headrest 4 is a portion of the vehicle seat 1 which is configured to support the head of the seated occupant.

Insertion slots 25 are provided in a connected portion of the seat cushion 3 (in a second pad member 20, FIG. 7), between the seat back 2 and a rear portion of the seat cushion 3. When installing a child safety seat to the vehicle seat 1, an ISOFIX connector (or other suitable lock mechanism) of the child safety seat is inserted through each of the insertion slots 25. The insertion slot 25 is a rectangular opening extending from the front side towards the back side of the seat.

An ISOFIX bar as a frame member of the vehicle seat 1 is arranged at the insertion slot 25. The ISOFIX connector of the child safety seat, which is inserted into the insertion slot 25, is engaged with the ISOFIX bar when installing the child safety seat; thereby, the child safety seat is locked on to the vehicle seat 1. As shown in FIG. 1, cover grooves 7, by each of which the ISOFIX connector of the child safety seat is guided toward the insertion slot 25, are formed in a surface of the seat cushion 3. The ISOFIX connector of the child safety seat is guided by the cover groove 7 toward the insertion slot 25, therefore being easily inserted through the insertion slot 25.

Figure 2:
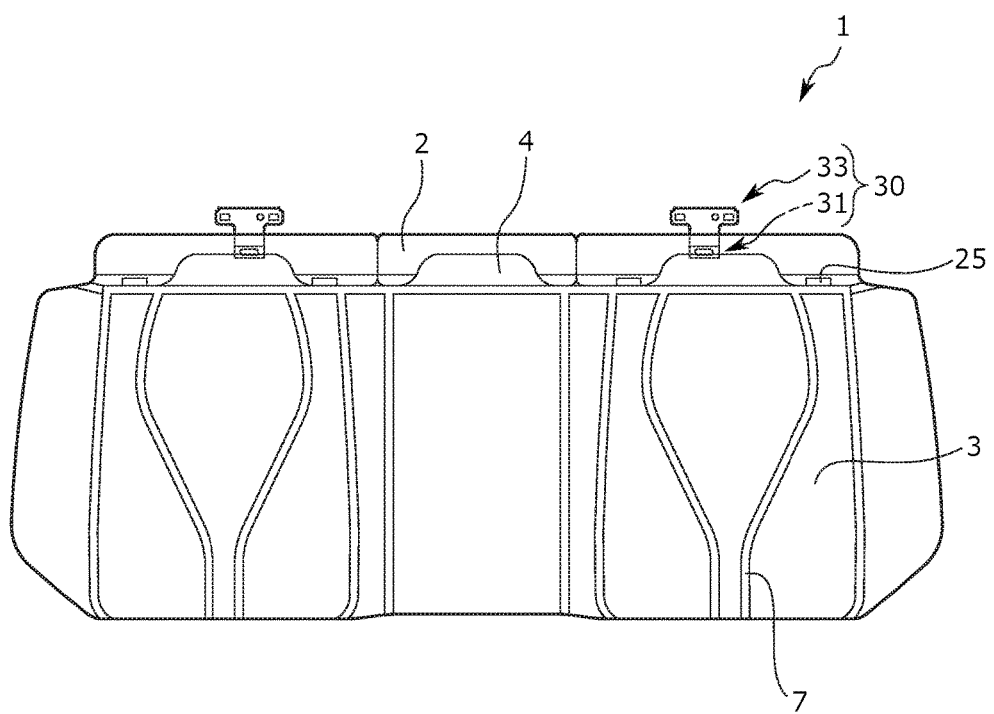
FIG. 2 is a top view of the vehicle seat, according to an embodiment.
Figure 3:
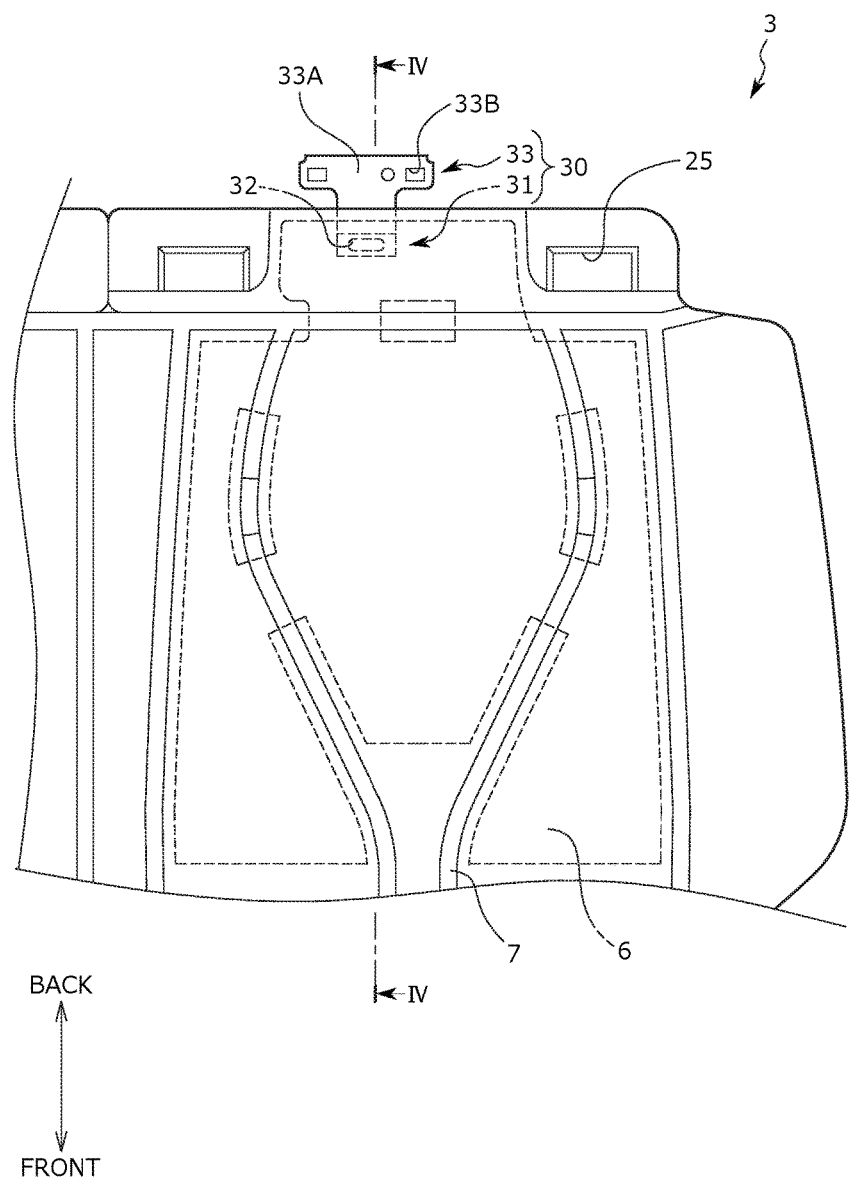
FIG. 3 is a partial enlarged view showing a seating portion of the vehicle seat, according to an embodiment.
Figure 4:
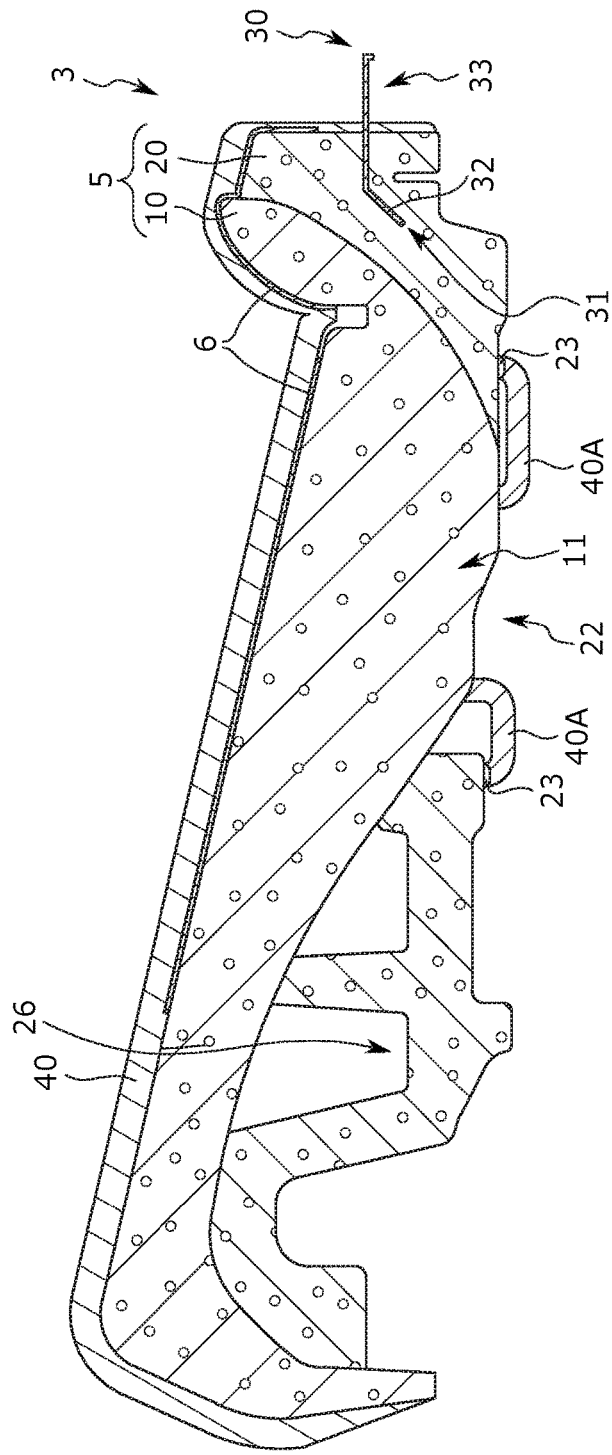
FIG. 4 is a cross-sectional view of the seat cushion taken along the line IV-IV of FIG. 3, according to an embodiment.
Figure 5:
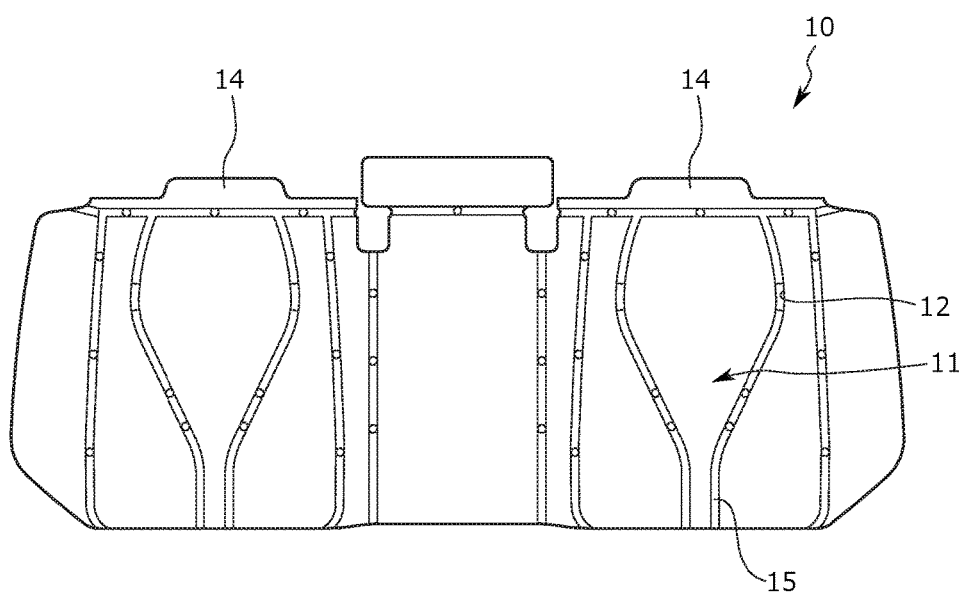
FIG. 5 is a top view of a first pad member of the vehicle seat, according to an embodiment.
Figure 6:
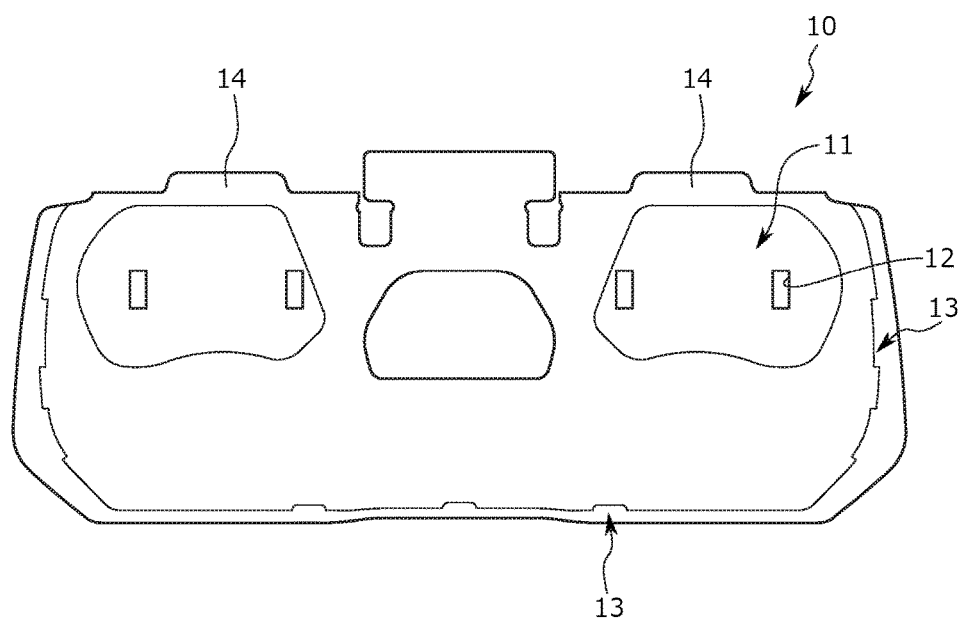
FIG. 6 is a bottom view of the first pad member of the vehicle seat, according to an embodiment.
Figure 7:
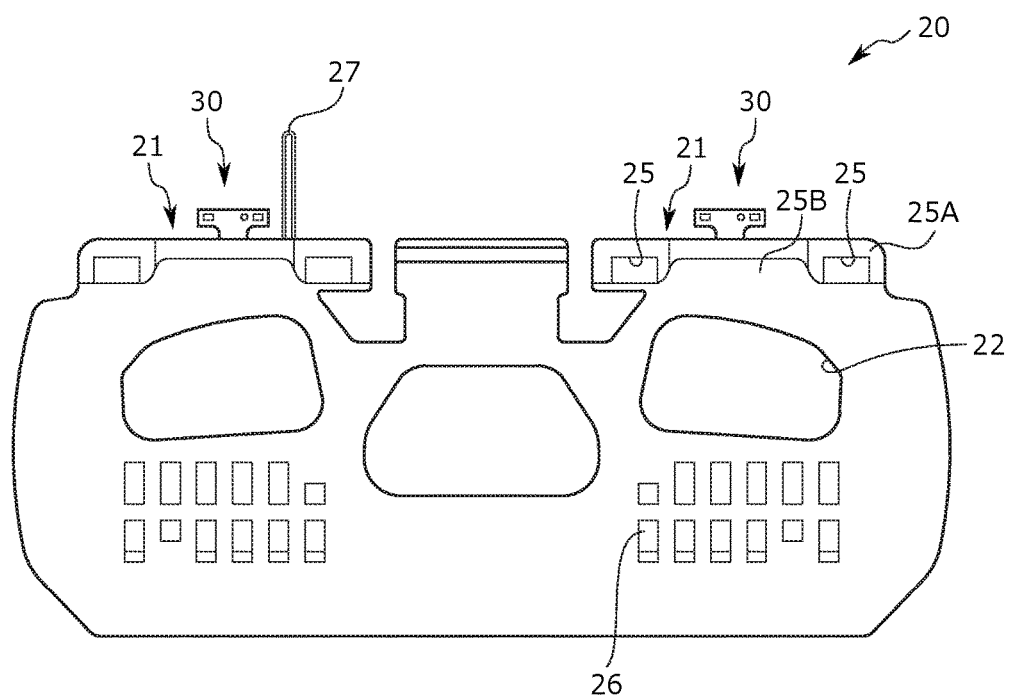
FIG. 7 is a top view of a second pad member of the vehicle seat, according to an embodiment.
Figure 8:
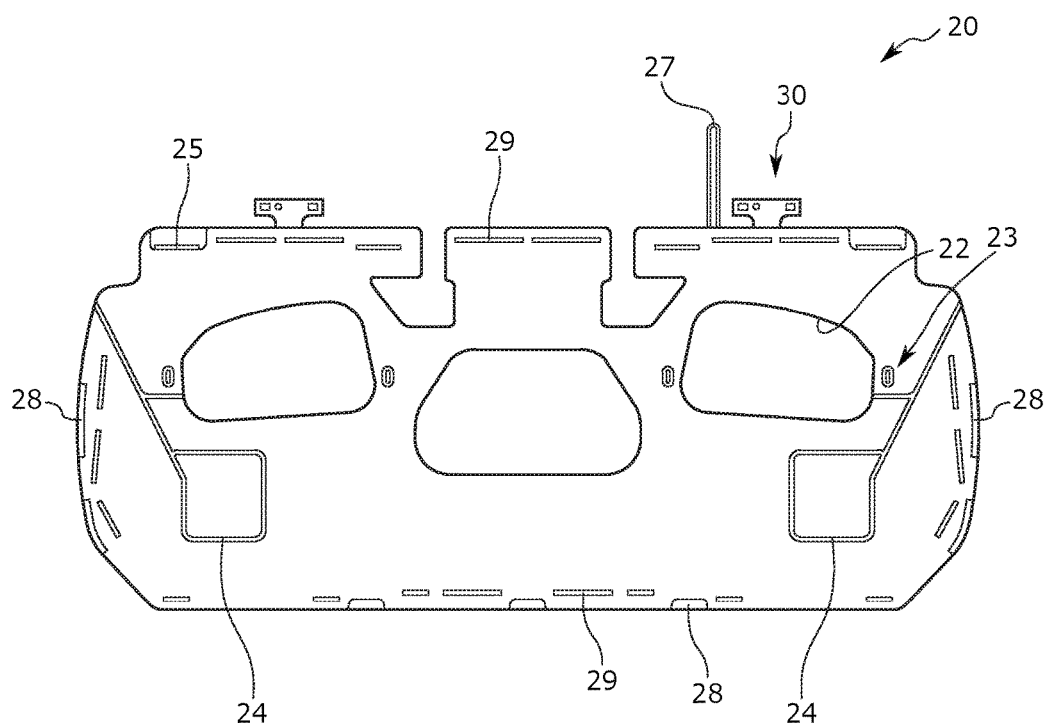
FIG. 8 is a bottom view of the second pad member of the vehicle seat, according to an embodiment.
Figure 9:
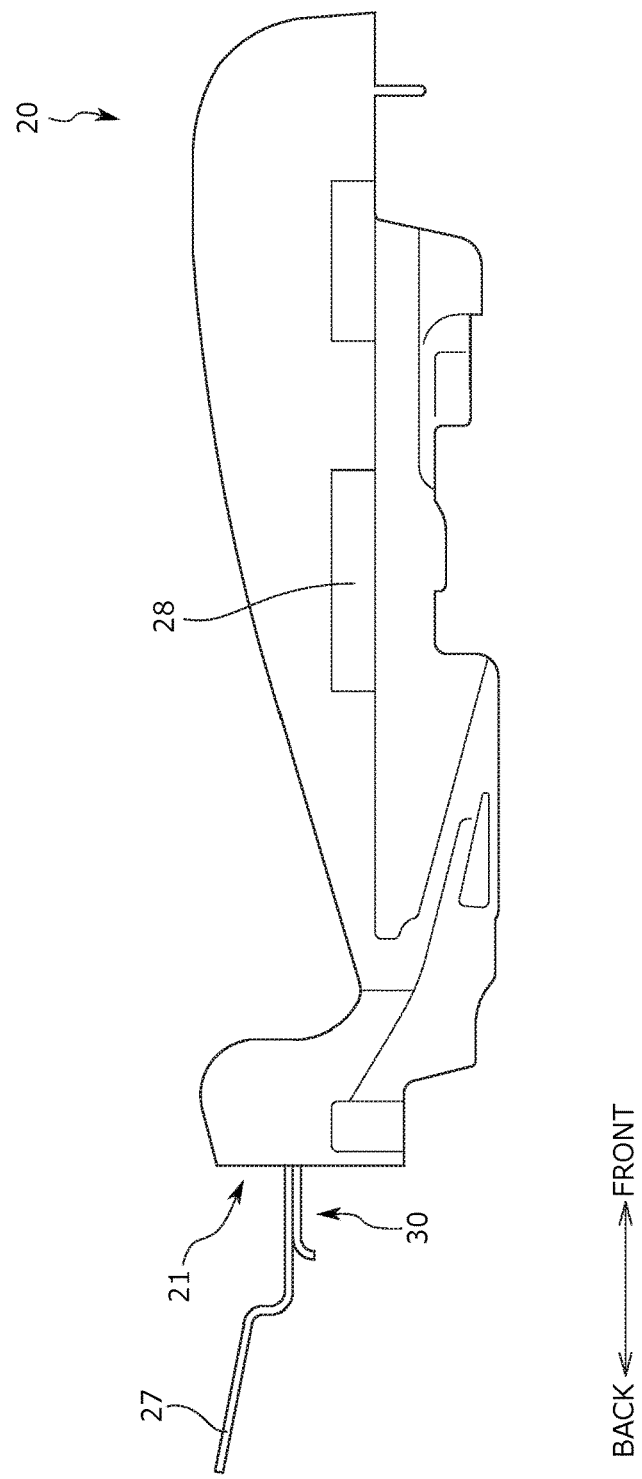
FIG. 9 is a side view of the second pad member of the vehicle seat, according to an embodiment.

Next, the configuration of the seat cushion 3 is described with reference to FIGS. 2 to 9. The overview of each figure is as follows. FIG. 2 is a top view of the vehicle seat 1. FIG. 3 is a partial enlarged view showing a left seating portion of the vehicle seat 1. FIG. 4 is a cross-sectional view of the seat cushion taken along the line IV-IV of FIG. 3. FIG. 5 is a top view of a first pad member 10. FIG. 6 is a bottom view of the first pad member 10. FIG. 7 is a top view of a second pad member 20. FIG. 8 is a bottom view of the second pad member 20. FIG. 9 is a side view of the second pad member 20.

As shown in FIGS. 2 to 4, the seat cushion 3 includes a seat pad 5, seat heaters 6, and a cover 40. Specifically, the seat cushion 3 is configured such that the seat pad 5 having a top surface on which the heaters 6 are mounted is covered by the cover 40.

As shown in FIG. 4, the seat pad 5 includes the first pad member 10 and the second pad member 20 that is made of a material firmer than that of the first pad member 10. The first pad member 10 is arranged on the second pad member 20. In other words, the first pad member 10 is supported from below by the second pad member 20.

The configuration of the first pad member 10 is described here. The first pad member 10 is a buffer which is made of, for example, foamed resin such as urethane foam. As shown in FIG. 5 and FIG. 6, the first pad member 10 has substantially the same shape as that of the top surface of the seat cushion 3.

As shown in FIGS. 4 to 6, bulging portions 11, each of which is a downwardly bulging bottom surface portion of the first pad member 10, serves to support the buttocks of the seated occupant. When the first pad member 10 is arranged on the second pad member 20, bottom surface portions of the bulging portions 11 are fitted into openings 22 of the second pad member 20.

Also, pull-in holes 12 are formed in respective portions of grooves 15 formed in the first pad member 10. As shown in FIG. 4, end portions 40A of the cover 40 are pulled in through the respective pull-in holes 12 toward a bottom surface of the first pad member 10.

Furthermore, as shown in FIG. 5, rear extensions 14 of the first pad member 10 extending rearward are formed at the rear side of the first pad member 10. When the first pad member 10 is arranged on the second pad member 20, each of the rear extensions 14 is positioned to cover a portion 25B (corresponding to a first portion) between the right and left insertion slots 25 of the second pad member 20. A peripheral portion 25A (corresponding to a second portion) around the insertion slots 25 is not covered by the first pad member 10. The second pad member 20 is exposed on the peripheral portion 25A around the insertion slot 25. With such a configuration, when inserting the ISOFIX connector through the insertion slot 25, the ISOFIX connector can be prevented from getting stuck with the peripheral portion 25A around the insertion slot 25. Also, the portion 25B between the right and left insertion slots 25 is covered by the first pad member 10 as the buffer; therefore, the second pad member 20 which is firmer than the first pad member 10 is prevented from making contact with the lumbar region of the occupant not via the first pad member 10.

Next, the configuration of the second pad member 20 is described. The second pad member 20, made of, for example, foamed resin such as expanded polypropylene (EPP), is a supporting member for supporting the first pad member 10 from below.

As shown in FIG. 7, the openings 22 are formed in a top surface of the second pad member 20 and each of the openings 22 is positioned to face a seating surface portion on which the occupant is seated. As shown in FIG. 4 and FIG. 7, a plurality of recesses 26 recessed downward are formed in front of the right and left openings 22. The plurality of recesses 26 are arranged side by side in the width direction of the seat and in the front to back direction of the seat. The plurality of recesses 26 are provided in the second pad member 20 as just described; thereby, spaces can be formed in the second pad member 20. Consequently, the second pad member 20 can be more lightweight.

Also, as shown in FIG. 7 and FIG. 9, brackets 30 are positioned at the rear side of the right and left openings 22 and attached to respective rear surface portions 21 of the second pad member 20. The second pad member 20 is injection-molded with the brackets 30 inserted in a mold of the second pad member 20; thereby, the brackets 30 are attached to the second pad member 20.

As shown in FIG. 3 and FIG. 4, each of the brackets 30 includes an embedded portion 31 embedded in the second pad member 20 and a protrusion 33 that protrudes from the second pad member 20 towards the back side of the seat. The embedded portion 31 includes a horizontally extending portion that extends horizontally and an angled portion that is angled from the horizontally extending portion. A through-hole 32 is formed in the angled portion.

As described above, the through-hole 32 is formed in the embedded portion 31; thereby, at the time of injection molding, the second pad member 20 is molded in a state where the EPP forming the second pad member 20 enters the through-hole 32 of the embedded portion 31. Accordingly, the bracket 30 can be firmly fixed to the second pad member 20, therefore being prevented from disengaging from the second pad member 20.

Also, the embedded portion 31 includes the angled portion inclined downward. Therefore, the required length of the embedded portion 31 can be secured while the second pad member 20 is not pierced by the embedded portion 31. Consequently, connection between the bracket 30 and the second pad member 20 is enhanced; thereby, the bracket 30 can be prevented from disengaging from the second pad member 20.

Furthermore, as shown in FIG. 3, the protrusion 33 of the bracket 30 includes an attachment surface 33A on which electric components such as an ECU and a wiring harness are to be attached. One or more through-holes 33B for locking the electric components are formed in the attachment surface 33A. Each of the through-holes 33B may have a circular shape, a rectangular shape, or the like, but are not especially limited thereto. Alternatively, the through-hole 33B may be a cutout.

As shown in FIGS. 7 to 9, a U-shaped wire 27 is attached to one of the rear surface portions 21 of the second pad member 20. The wire 27 is a member for mounting the vehicle seat 1 including the second pad member 20 on a vehicle body.

Also, as shown in FIG. 4 and FIG. 8, cover lock portions 23 are formed around each of the openings 22 on a back surface of the second pad member 20. As shown in FIGS. 3 to 6, each of the end portions 40A of the cover 40 is locked, through the pull-in hole 12 of the first pad member 10 and the opening 22 of the second pad member 20, to a corresponding one of the cover lock portions 23 of the second pad member 20.

Further, as shown in FIG. 8, a plurality of lock portions 29 are formed at an outer peripheral portion of the back surface of the second pad member 20. Hooks provided at an outer peripheral edge portion of the cover 40 are inserted in the lock portions 29; thereby, the outer peripheral edge portion of the cover 40 is fixed to the second pad member 20.

Furthermore, as shown in FIG. 8, guide grooves 24 are formed in the back surface of the second pad member 20. A wiring harness can be placed in the guide grooves 24. Each of the guide grooves 24 is connected to the opening 22; therefore, the wiring harness can be easily arranged through the opening 22 and the guide groove 24 to extend toward the rear side of the second pad member 20.

Moreover, as shown in FIG. 8 and FIG. 9, a plurality of recesses 28 cut out toward the inner side of the seat are formed in side surfaces of the second pad member 20. The recesses 28 are brought into engagement with protrusions 13 formed at an outer peripheral portion of the first pad member 10 shown in FIG. 6; thereby, a positional displacement between the first pad member 10 and the second pad member 20 can be inhibited.

Figure 10:
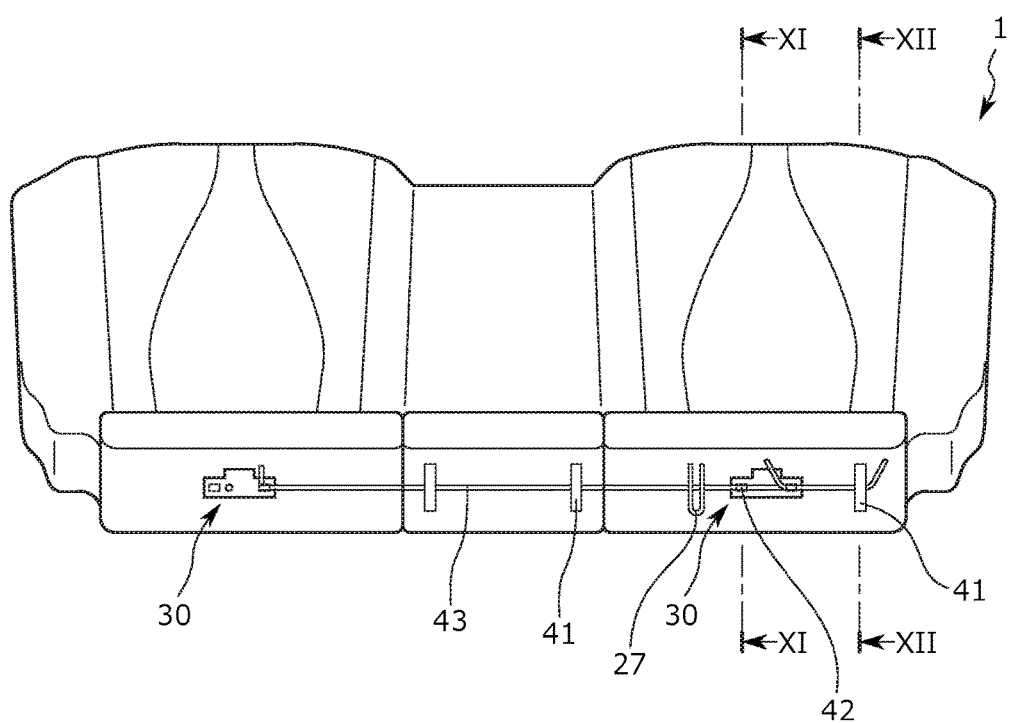
FIG. 10 is a top view of the vehicle seat showing an attachment mechanism of a wiring harness at a rear surface of the vehicle seat, according to an embodiment.
Figure 11:
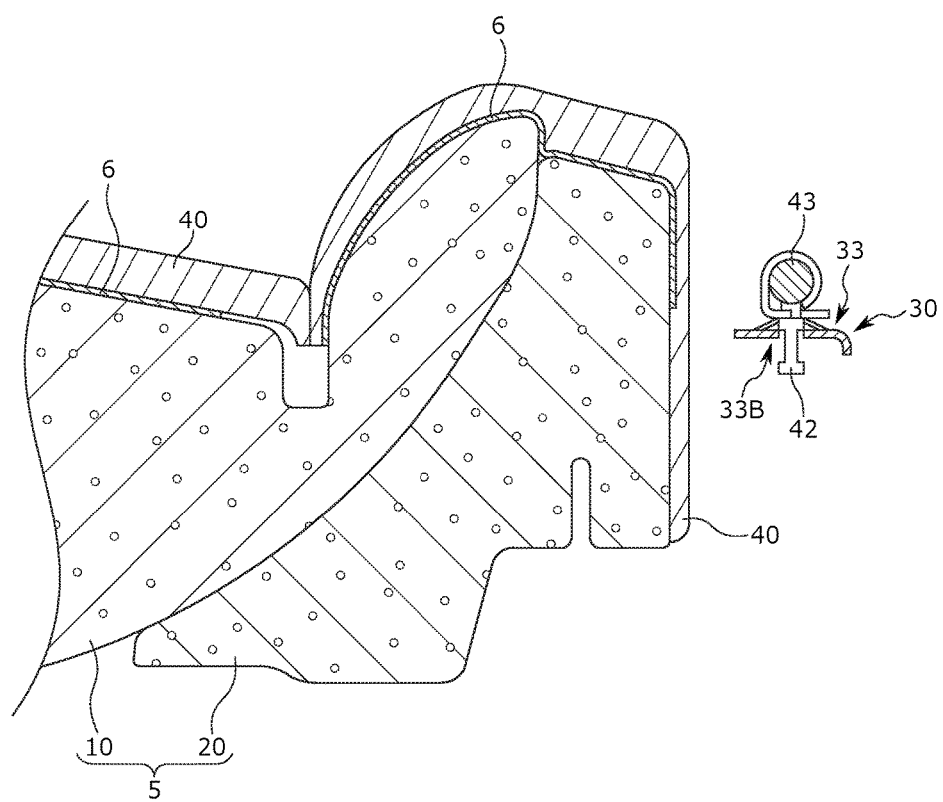
FIG. 11 is a partial, cross-sectional view of the vehicle seat taken along the line XI-XI of FIG. 10, according to an embodiment.
Figure 12:
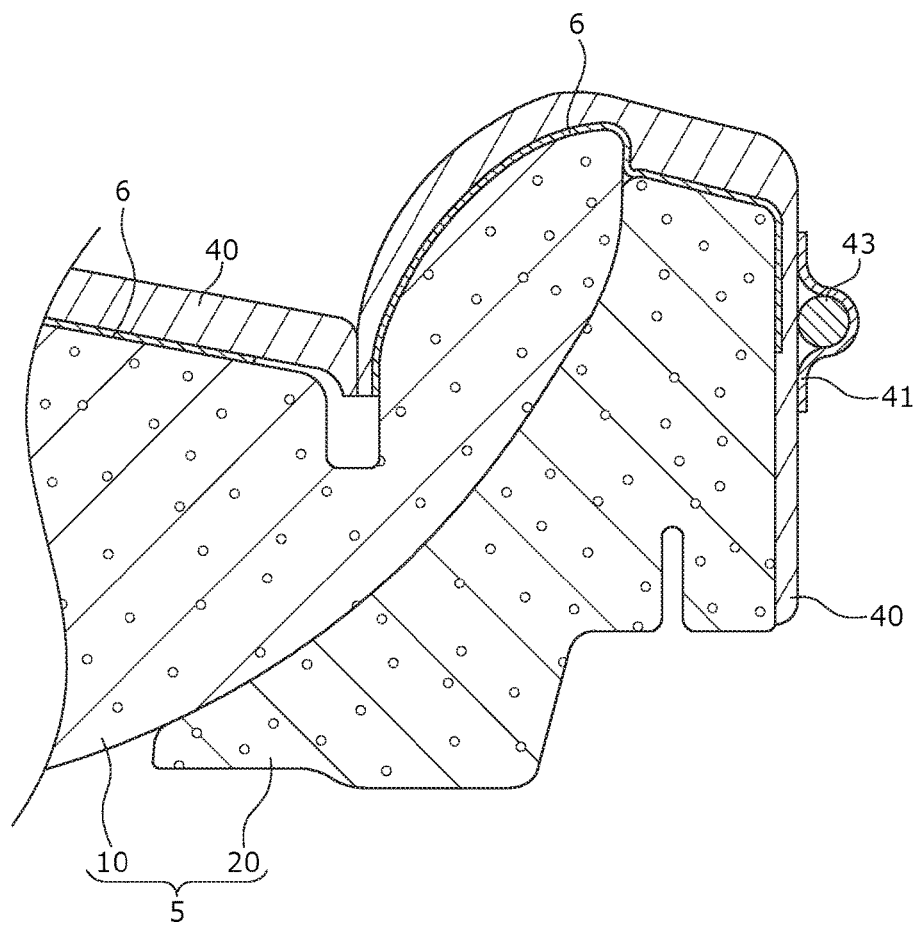
FIG. 12 is a partial, cross-sectional view of the vehicle seat taken along the line XII-XII of FIG. 10, according to an embodiment.

Here, an example of a state where the electric components are attached to a rear surface of the vehicle seat 1 is described with reference to FIGS. 10 to 12. The overview of each figure of FIGS. 10 to 12 is as follows. FIG. 10 is a top view of the vehicle seat showing a state where a wiring harness 43 is attached to the rear surface of the vehicle seat 1. FIG. 11 is a partial, cross-sectional view of the vehicle seat taken along the line XI-XI of FIG. 10. FIG. 12 is a partial, cross-sectional view of the vehicle seat taken along the line XII-XII of FIG. 10.

In an example shown in FIG. 10, the wiring harness 43 for connection to the heaters 6 is attached to the brackets 30. Specifically, as shown in FIG. 11, an end portion of each of clips 42 for connection to the wiring harness 43 is locked into the through-hole 33B of each bracket 30. Thus, the wiring harness 43 is fixed to the bracket 30.

Also, as shown in FIG. 10 and FIG. 12, hook-and-loop fasteners 41 are attached to the cover 40. The hook-and-loop fasteners 41 are held between the wiring harness 43 and the cover 40; thereby, the wiring harness 43 can be arranged along the cover 40 of the vehicle seat 1.

According to the vehicle seat 1 described above, interior components can be attached to the attachment surface 33A of the protrusion 33 protruding outward from the second pad member 20. Therefore, the workability of attaching or removing the electric components to or from the vehicle seat 1 can be improved. Consequently, maintenance on the vehicle seat 1 can be facilitated. Also, a portion of the bracket 30 is embedded in the second pad member 20 to be held by the second pad member 20 firmer than the first pad member 10; thereby, the rigidity of attachment of the bracket 30 can be enhanced.

Further, in the vehicle seat 1, the second pad member 20 is made of expanded polypropylene (EPP). The second pad member 20 is injection-molded with the brackets 30. Thus, rigidity of the seat pad 5 can be enhanced. Furthermore, the brackets 30 are further firmly held by the second pad member 20.

Moreover, in the vehicle seat 1, the first pad member 10 of the seat pad 5 arranged close to the occupant is made of urethane form; thereby, seating comfort of the seat can be improved.

Also, in the vehicle seat 1, the through-hole 32 is formed in the embedded portion 31 of the bracket 30; thereby, the bracket 30 can be further firmly fixed to the second pad member 20. Therefore, the bracket 30 can be prevented from disengaging from the second pad member 20.

Further, in the vehicle seat 1, the protrusion 33 of the bracket 30 protrudes from the rear surface portion 21 of the second pad member 20 toward the back side of the seat. Thus, the bracket 30 on which the electric components are to be attached can be arranged at the rear surface of the second pad member 20. Consequently, the electric components can be attached not to interfere with the occupant.

Furthermore, in the vehicle seat 1, the end portion 40A of the cover 40 is locked through the pull-in hole 12 of the first pad member 10 and the opening 22 of the second pad member 20 to the cover lock portion 23 formed on the back surface of the second pad member 20. Thus, the workability of pulling in the cover 40 located on the seating surface portion can be improved. In addition, the end portion 40A does not interfere with the occupant; therefore, seating comfort of the seat can be improved.

Moreover, in the vehicle seat 1, the guide grooves 24 in which the wiring harness 43 is arranged are formed in the back surface of the second pad member 20. Accordingly, the wiring harness 43 is arranged along the guide grooves 24; thereby, the workability of attaching the wiring harness 43 can be improved. Also, the wiring harness 43 is protected by the guide grooves 24, thereby being inhibited from being disconnected.

Also, the vehicle seat 1 includes the hook-and-loop fasteners 41 attached to the cover 40 to hold the wiring harness 43. Thus, the wiring harness 43 can be easily held along the cover 40.

Further, in the second pad member 20 of the vehicle seat 1, the peripheral portion 25A around the plurality of insertion slots 25 for insertion of the ISOFIX connectors is not covered by the first pad member 10 while the portion 25B between the insertion slots 25 is covered by the first pad member 10. The peripheral portion 25A around the insertion slot 25 into which the ISOFIX connector of the child safety seat is inserted is not covered by the first pad member 10; therefore, the child safety seat is more easily installed. Also, the portion 25B between the insertion slots 25, which is configured to support the lumbar region of the occupant is covered by the first pad member 10; therefore, seating comfort is improved.

The present disclosure is not limited to the foregoing embodiment. Hereinafter, a second pad member 120 as a modified example of the second pad member 20 and a bracket 130 as a modified example of the bracket 30 is described with reference to FIG. 13. The second pad member 120 is injection-molded with the brackets 130 and is made of EPP.

Figure 13:
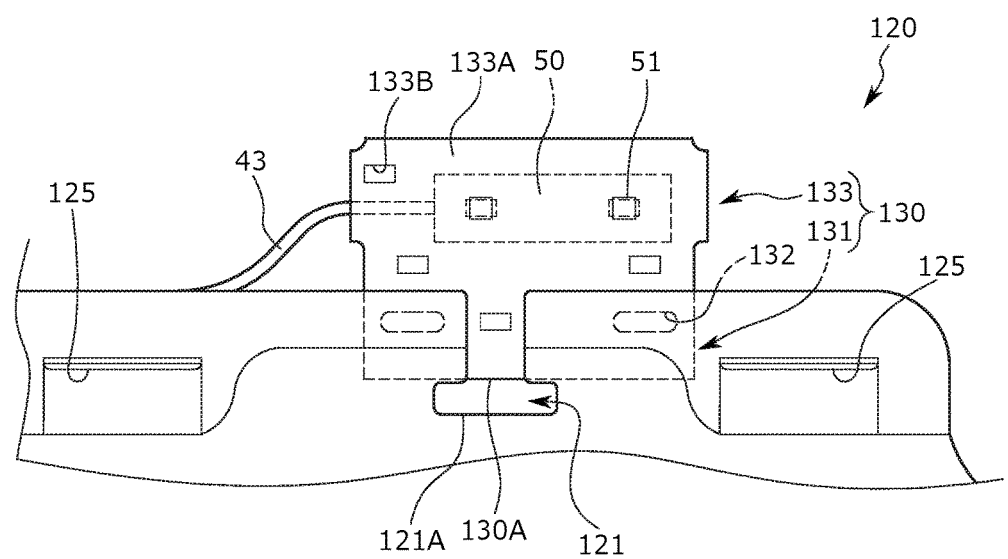
FIG. 13 is a partial enlarged view showing a peripheral portion of a bracket of the vehicle seat according to a modified embodiment.

As shown in FIG. 13, a cutout 121 is formed in a rear end portion of the second pad member 120. An embedded portion 131 of the bracket 130 is embedded in the second pad member 120 to be located at a periphery of the cutout 121. Through-holes 132 are formed in the embedded portion 131. Accordingly, EPP enters the through-holes 132 at the time of injection molding; therefore, connection between the bracket 130 and the second pad member 120 is enhanced.

Here, when the bracket 130 is attached to overlap the cutout 121, a clearance is provided between a front end 121A of the cutout 121 and a front end 130A of the bracket 130. Thus, the clearance between the cutout 121 and the bracket 130 is utilized; thereby, electric components such as a wiring harness can be arranged. Therefore, flexibility in arranging the electric components can be increased.

Also, the bracket 130 includes a protrusion 133 that protrudes outward from the second pad member 120. The protrusion 133 includes an attachment surface 133A on which components such as electric components and interior components are to be attached. A plurality of through-holes 133B is formed in the attachment surface 133A. Here, in the example shown in FIG. 13, an ECU 50 is arranged on a bottom surface of the attachment surface 133A, and attachment portions 51 of the ECU 50 are locked into the through-holes 133B. Therefore, the ECU 50 is attached to the bottom surface of the bracket 130. As just described, the ECU 50 is attached to the bottom surface of the bracket 130; thereby, the ECU 50 can be arranged to be concealed when viewed from above. The electric components can also be arranged on a top surface of the bracket 130. Likewise, the electric components can be arranged on the top or bottom surface of the bracket 30.

Also, in the example shown in FIG. 13, the ECU 50 is attached into the through-holes 133B arranged side by side in the width direction of the seat. Alternatively, the ECU 50 may be attached into the through-holes 133B arranged side by side in the front to back direction.

Further, an example where the brackets 30 (the brackets 130) are attached to the seat cushion 3 is described in the foregoing embodiments. Alternatively, the brackets 30 (or the brackets 130) may be attached to the seat back 2.

Furthermore, besides EPP, the second pad member 20 may be made of a foam-molded member or a three-dimensional network structure which has compressive strength higher than that of the first pad member 10. For example, the foam-molded member may include thermoplastic resins such as polystyrene resin, polyolefin resin, or composite resin of polystyrene resin and polyolefin resin.

Also, the present disclosure may be applied not only to a vehicle seat but also to seats for various types of vehicles such as trains, airplanes, and ships.

TABLE OF REFERENCE NUMERALS

1: vehicle seat
2: seat back
3: seat cushion
4: headrest
5: seat pad
6: heater
7: cover groove
10: first pad member
11: bulging portion
12: pull-in hole
13: protrusion
14: rear extension
15: groove
20, 120: second pad member
21: rear surface portion
22: opening
23: cover lock portion
24: guide groove
25, 125: insertion slot
25A: peripheral portion around insertion slot (second portion)
25B: portion between insertion slots (first portion)
26: recess
27: wire
28: recess
29: lock portion
30, 130: bracket
31, 131: embedded portion
32, 132: through-hole
33, 133: protrusion
33A, 133A: attachment surface
33B, 133B: through-hole
40: cover
40A: end portion of cover
41: hook-and-loop fastener
42: clip
43: wiring harness
50: ECU
51: attachment portion

What is claimed is:

1. A vehicle seat comprising:
a seat pad; and
a bracket configured to be held by the seat pad;
wherein:
the seat pad includes a first pad member and a second pad member that is firmer than the first pad member;
the bracket includes an embedded portion embedded in the second pad member and a protrusion that protrudes outward from the second pad member;
a through-hole is formed in the embedded portion; and
the protrusion includes an attachment surface in which a hole for attachment of a component is formed.

2. The vehicle seat according to claim 1, wherein the second pad member is made of expanded polypropylene and is insert-molded with the bracket.

3. The vehicle seat according to claim 2, wherein the first pad member is made of urethane foam and is arranged on the second pad member.

4. The vehicle seat according to claim 1, wherein:
the second pad member includes a rear surface portion which is not covered by the first pad member; and
the protrusion protrudes from the rear surface portion to a rear of the seat.

5. The vehicle seat according to claim 1, wherein:
a cutout is formed in a rear end portion of the second pad member,
the bracket is attached to overlap the cutout; and
a clearance is provided between a front end of the cutout and a front end of the bracket.

6. The vehicle seat according to claim 1, further comprising a cover configured to cover the seat pad,
wherein:
a pull-in hole through which an end portion of the cover extends is formed in the first pad member;
an opening is formed in the second pad member to face a bulging portion of the first pad member formed by downwardly bulging a bottom surface portion of the first pad member; and
the end portion of the cover is locked through the pull-in hole and the opening to a lock portion formed in a back surface of the second pad member.

7. The vehicle seat according to claim 1, wherein a guide groove in which a wiring harness is to be arranged is formed in a back surface of the second pad member.

8. The vehicle seat according to claim 1, further comprising a cover configured to cover the seat pad and a hook-and-loop fastener attached to the cover to hold a wiring harness.

9. The vehicle seat according to claim 1, wherein:
a plurality of insertion slots, through each of which an ISOFIX connector is to be inserted, are formed in the second pad member;
a first portion of the second pad member, covered by the first pad member, is provided between the plurality of insertion slots; and
a second portion of the second pad member, not covered by the first pad member, is provided in peripheries around the plurality of insertion slots.

10. A vehicle seat comprising:
a seat pad; and
a bracket configured to be held by the seat pad;
wherein:
the seat pad includes a first pad member and a second pad member that is firmer than the first pad member;
a guide groove in which a wiring harness is to be arranged is formed in a back surface of the second pad member;
the bracket includes an embedded portion embedded in the second pad member and a protrusion that protrudes outward from the second pad member; and
the protrusion includes an attachment surface in which a hole for attachment of a component is formed.

11. A vehicle seat comprising:
a seat pad; and
a bracket configured to be held by the seat pad;
wherein:
the seat pad includes a first pad member and a second pad member that is firmer than the first pad member;
a plurality of insertion slots, through each of which an ISOFIX connector is to be inserted, are formed in the second pad member;

a first portion of the second pad member, covered by the first pad member, is provided between the plurality of insertion slots;
a second portion of the second pad member, not covered by the first pad member, is provided in peripheries around the plurality of insertion slots;
the bracket includes an embedded portion embedded in the second pad member and a protrusion that protrudes outward from the second pad member; and
the protrusion includes an attachment surface in which a hole for attachment of a component is formed.

\* \* \* \* \*